E. L. GALE, Sr.
BRAKE CONTROL FOR ELEVATORS.
APPLICATION FILED DEC. 23, 1909.
1,060,836.
Patented May 6, 1913.
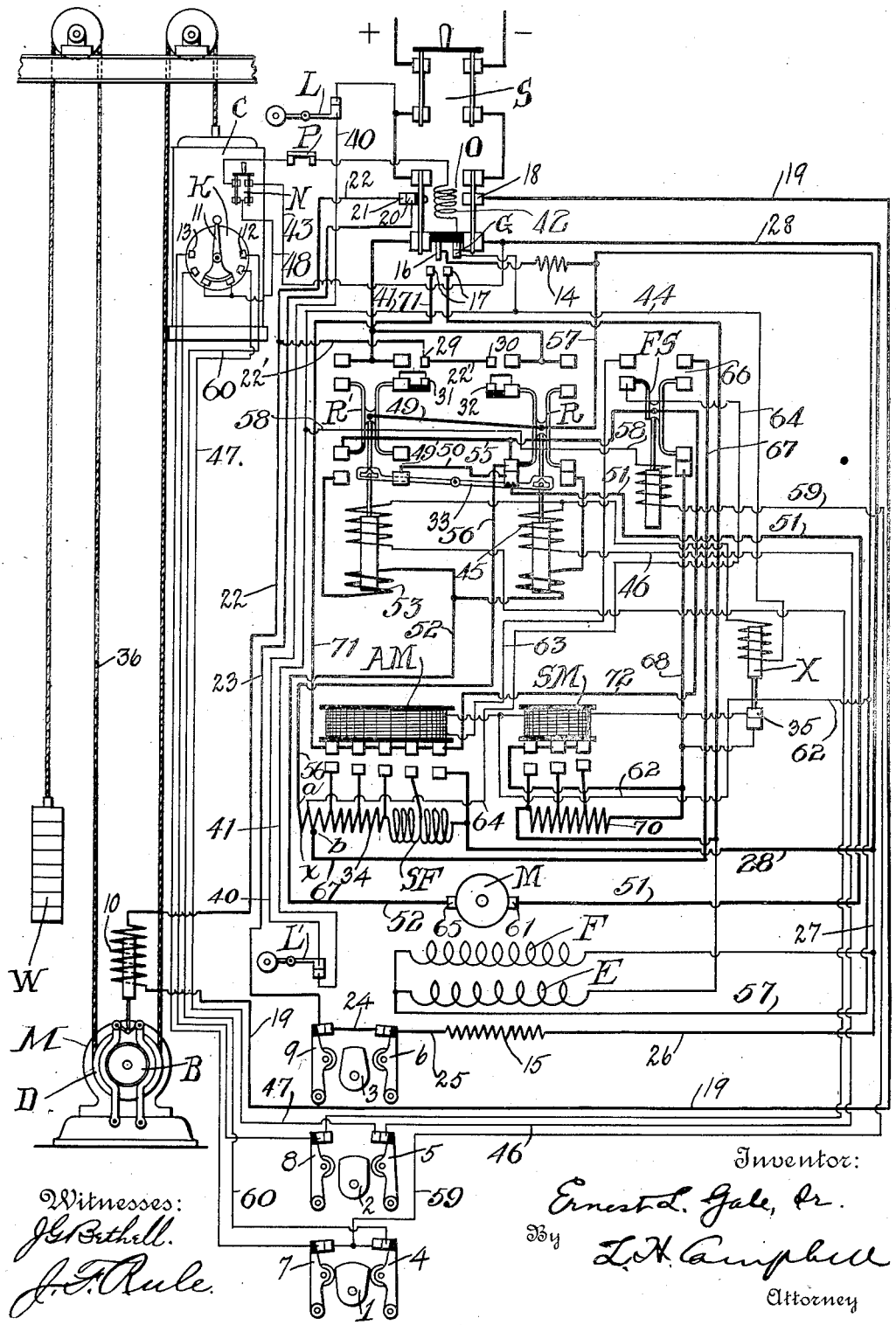
Witnesses:
J. G. Bethell.
J. F. Rule.
Inventor:
Ernest L. Gale, Sr.
By L. H. Campbell
Attorney

UNITED STATES PATENT OFFICE.

ERNEST L. GALE, SR., OF YONKERS, NEW YORK, ASSIGNOR TO OTIS ELEVATOR COMPANY, OF JERSEY CITY, NEW JERSEY, A CORPORATION OF NEW JERSEY.

BRAKE CONTROL FOR ELEVATORS.

1,060,836.      Specification of Letters Patent.      Patented May 6, 1913.

Application filed December 23, 1909. Serial No. 534,695.

*To all whom it may concern:*

Be it known that I, ERNEST L. GALE, Sr., a citizen of the United States, residing at Yonkers, in the county of Westchester and State of New York, have invented a new and useful Improvement in Brake Control for Elevators, of which the following is a specification.

My invention relates to brake apparatus used in connection with electric motors and systems of control, and particularly adaptable to electric elevators.

One of the objects of my invention is to provide means whereby the brake is first applied lightly, and thereafter the full braking power is automatically exerted.

Another object of my invention is to provide means whereby the brake is applied extra hard when either a stop motion switch or the automatic switch is opened.

Other objects will hereinafter appear, the novel combination of elements being pointed out in the claims.

The accompanying drawing is a diagrammatic representation of the various devices and the electrical connections which show my invention as employed in an electric elevator installation.

The car C and the counterweight W are supported in a well-known manner by the cables 36 which pass around the hoisting drum D. The motor M, the drum D and the brake device B are directly connected by being mounted on the same shaft. The controlling mechanism for the motor comprises the automatic or potential switch O, the reversing switches R, R', the accelerating magnet AM, stopping magnet SM, auxiliary stopping magnet X, fast speed magnet FS, and the parts hereinafter referred to.

When the main line switch S and the potential switch O are closed a holding circuit for the latter is established as follows— from the positive main designated + through the switch S, limit switch L, wire 40, limit switch L', wire 41, contact switch G, holding coil 42 of the potential switch O, slack cable switch P, car safety switch N, and wire 43 to the minus wire 28, the latter being connected through the switches O and S to the negative main, designated —. If the lever 11 of the car switch K is moved to the left a circuit for the magnet of the reversing switch R is closed, which circuit may be traced from the positive main through the limit switches L, L', wires 41, 44, auxiliary stopping magnet X, magnet coil 45 of the reversing switch R, wire 46, stop motion switch 5, wire 47, controller K, wire 48, safety switch N, wire 43 and to the negative main. The magnet X and the reversing switch R are therefore operated and the latter makes a circuit for the motor armature. This circuit is from the positive main through the upper contacts of the reversing switch R, wire 49, contacts 49' of reversing switch R', wires 50, 51, armature of the motor M, wire 52, holding coil 53 of reversing switch R', contacts 54, wires 55, 56, starting resistance 34, series field SF, and wire 28 to the negative main. The shunt field F of the motor also receives current through a circuit from the positive main through reversing switch R, wire 57, shunt field F, and wires 27, 28. The brake magnet receives current to lift the brake as hereinafter described. The motor now starts and runs at slow speed. When the controller lever 11 is moved farther to the left a circuit is closed through the contact 12 for the fast speed magnet FS. This circuit is from the positive main through the reversing switches L and L', wires 41, 58, coil of fast speed magnet FS, wire 59, stop motion switch 4, wire 60, switch K, wire 48, switch N, and wire 43 to the negative main. The fast speed magnet FS is therefore operated and short-circuits the portion of the starting resistance 34 between the points $a$ and $b$. This short circuit is from the point $a$ through wires 56, 55, contacts 66 of the magnet FS, and wire 67 to the point $b$. The magnet FS also establishes a circuit for the accelerating magnet AM across the motor armature and a small portion $x$ of the starting resistance 34. This circuit may be traced from the motor brush 61, through wires 51, 50, contacts 49', wires 49, 57, 62, accelerating magnet AM, wire 63, fast speed magnet FS, wire 64, section $x$ of the starting resistance, wires 56, 55, contacts 54, holding coil 53 and wire 52 to the armature brush 65. The accelerating magnet operates in a well-known manner to gradually short-circuit the remainder of the starting resistance 34 and shunt field coils SF and bring the motor up to full speed.

To stop the motor, the car switch K is brought back to central position and thereby effects the opening of the circuits for the fast speed magnet FS, the reversing switch magnet and the auxiliary stopping magnet X. The motor armature is thereby disconnected from the supply mains. The magnet X drops its core and closes the switch contacts 35 thereby connecting the stopping magnet SM in a circuit across the motor armature as follows:—from the armature brush 61 through wires 51, 50, contacts 49', wires 49, 57, 62, stopping magnet SM, switch 35, wires 68, magnet switch FS, wire 55, switch contacts 54, holding magnet 53 and wire 52 to the armature brush 66. A circuit is also established through the extra field E and the extra field resistance 70, in series across the motor armature, as follows:—from brush 61 through wires 51, 50, switch 49', wires 49, 57, extra field E, extra field resistance 70, wire 68, magnet switch FS, wire 55, switch contacts 54, holding magnet 53, and wire 52 to the armature brush 65. The stopping magnet SM lifts one or more of its contacts to short-circuit more or less of the resistance 70 in accordance with the speed of the motor.

When the potential switch O opens, current is cut off from the motor and a dynamic brake circuit including the resistance 14 is connected across the motor armature. This circuit is from the brush 61, through conductors 51, 50, switch contacts 49', wires 49, 57, resistance 14, back contacts 16, 17, conductors 71, 72, 55, switch contacts 54, coil 53, wire 52 to the brush 65. The stop motion switches 4, 5, 6 and 7, 8, 9 are arranged to be automatically operated as the car C approaches the upper or lower limit of its travel. The opening of the switches 4, 5 or 7, 8 has the same effect on the controlling apparatus as the movement of the car controller K to central position. The switches 6 and 9 control the brake as will presently appear.

The brake B may be of any well known type, my invention consisting, mainly, in the manner of connecting the brake magnet winding 10 to the source of supply and through the resistance 15. The contact 18 is so located that when the automatic switch O is closed, electrical connection is made from the negative lead by way of contact 18 and conductor 19 to one terminal of the brake winding 10. The other terminal of the brake winding 10 is connected by means of conductor 22 to the fixed contact 21 and by the conductors 22 and 22' to the auxiliary reversing switch contacts 29 and 30. Auxiliary contacts 31 and 32 on the reversing switches R' and R, and electrically connected with the reversing switch contacts, make connection with the contact 29 or 30 respectively, when either reversing switch is closed. It is to be here noted that the reversing switches are so joined by the link 33 that when one switch is in its uppermost position the other is in the lowest position, and that when both reversing switches are deënergized, only one makes electrical connection with the lower fixed contacts. It is therefore evident that the brake winding receives current from the source of current supply only when one of the reversing switches is closed. A contact 20 secured to and insulated from the automatic switch O, is adapted to make connection with the fixed contact 21 when the said switch O is closed. Conductors 23, 24 and 25 connect the contact 20 through the contacts of the stop motion switches 9 and 6, to one terminal of the brake discharge resistance 15. The other terminal of the said resistance 15 is connected by means of conductors 26, 27, 28, automatic switch O to the supply main. Thus it is seen that when the automatic switch O is closed and a reversing switch is open, there will be a circuit through the brake winding 10 and the brake resistance 15 and when the automatic switch O is open the brake winding 10 will be in an open circuit.

In order that my invention and the operation thereof may be readily understood, a detailed description of the action will now be given. The main switch S and the automatic switch O will ordinarily be closed; the reversing switch R or R' is energized when the hand lever 11 of the controlling switch K is moved to the left or right respectively of the central position. As soon as a reversing switch is closed the motor shunt field F is fully excited, the motor armature M receives a starting current through the starting resistance 34 and the series field SF, and a circuit is closed from the automatic switch O by way of contact 18, conductor 19, brake magnet winding 10, conductor 22, the energized reversing switch, to and through the other side of the automatic switch O. Thus it is seen that the brake B is energized as soon as the reversing switch is closed. A further movement of the hand lever 11 closes a circuit through the fast speed contact 12 or 13, thereby energizing the fast speed magnet FS which in turn energizes the accelerating magnet AM and effects the acceleration of the motor in the well known manner. My invention relates specially to the action of the brake when the motor is stopped. The ordinary operation of the brake is effected when the lever 11 of the controller switch is returned to the central position, thereby deënergizing the reversing switch magnet which has been energized, and allowing the contacts 35 of the auxiliary stopping magnet X to be joined. This latter action causes the stopping magnet SM, and the extra field winding E to receive current from the motor through the circuit already traced, thereby causing a reduction in the speed of the motor. The opening of the reversing switch cuts off the supply of current from the mains to the brake magnet, a local circuit (previously traced) being maintained through the brake winding 10 and the resistance 15. This provides a discharge circuit for the brake winding 10, the effect of which is to prevent the instantaneous application of the brake B and to permit a gradual braking action on the motor. If the automatic switch O is opened when the motor is in operation, the motor and the brake are instantaneously cut off from the source of current supply, the local circuit also being opened at the contacts 20, 21, and also at the contact 18, the contact 16 joins the contacts 17 and interposes the resistance 14 in the local circuit with the armature M constituting an electro-dynamic brake on the motor. The brake is therefore instantaneously applied because there is no brake discharge circuit through the resistance 15.

The stop-motion switches 4, 5, 6, and 7, 8, 9, effect a reduction in speed or the complete stopping of the motor; the operation of the upper or lower stop-motion switches in succession effects first the opening of the fast speed switch, then the opening of the reversing switch which was energized, thereby allowing the brake winding 10 to discharge through the brake discharge resistance 15; and immediately following the last opened circuit, the opening of this discharge circuit, which causes the full application of the brake B. Thus it is seen that there is an automatic selective operation of the brake; that is, in the ordinary operation, the brake is applied in a manner to produce a smooth and gradual stopping of the motor and the apparatus associated therewith, while in an emergency the brake is applied with full strength. It is to be here noted that the brake may also be applied at any time by opening the car safety switch N which breaks the circuit through the holding coil of the automatic switch O.

I wish not to be limited to any particular type of brake or brake winding, nor to the exact combination or arrangement herein described, as it is evident that those familiar with the art may make various alterations without interfering with the spirit and scope of my invention. Either direct or alternating current apparatus is contemplated by my invention.

What I claim and desire to secure by Letters Patent of the United States, is:—

1. In a system of brake control, the combination of a brake magnet winding, a motor, reversing switches therefor, electrical connections whereby the brake magnet winding is energized when either reversing switch is closed, a discharge resistance connected in parallel with the brake winding, and automatic means for opening the circuit through said resistance.

2. In a system of electro-responsive brake control, the combination of a brake magnet winding, a motor, reversing switches therefor, an automatic switch to admit current through a closed reversing switch to the motor, connections from the brake magnet winding, one through the closed reversing switch and the other through the automatic switch to energize the brake magnet winding, and a discharge circuit for the brake magnet winding including said last-named connection.

3. In a system of electro-responsive brake control, the combination of a brake magnet winding, a motor, reversing switches therefor, an automatic switch, a contact associated with the automatic switch, circuit connections from the brake magnet winding to the said contact and from the brake through a reversing switch and thence through the automatic switch, and a discharge circuit for the brake magnet including said automatic switch.

4. In a brake control system, the combination of a brake magnet winding, a motor, reversing switches therefor, auxiliary contacts carried by the reversing switches, electrical connections with said contacts whereby an energizing circuit is closed through the said magnet winding only when a reversing switch is closed, a discharge circuit in parallel with the brake magnet winding, and an automatic switch in said discharge circuit.

5. In a system of brake control, the combination of a brake magnet winding, a motor, reversing switches for the motor, brake discharge resistance, auxiliary contacts on the reversing switches, means whereby the said resistance and the brake magnet winding receive current through an auxiliary contact when either reversing switch is closed, and an automatic circuit breaker in circuit with the discharge resistance between the latter and the brake magnet winding.

6. In a system of brake control, the combination of a brake magnet winding, a motor, reversing switches for the motor, brake discharge resistance, auxiliary contacts on the reversing switches, fixed contacts for making connection with the auxiliary contacts, conductors so connecting the fixed contacts, the brake magnet winding and the brake discharge resistance that a circuit is closed through one of the fixed contacts only when a reversing switch is closed, and automatic means between the discharge resistance and the brake magnet winding for opening the discharge circuit.

7. In a system of brake control, the combination of a motor and current supply mains, reversing switches for the motor, an automatic switch for admitting current through a reversing switch to the motor, a brake magnet winding having one terminal for connection through a reversing switch and the other through the automatic switch to the current supply mains, brake discharge resistance connected in parallel with the brake magnet winding, and automatic means for opening said parallel circuit.

8. In a system of brake control, the combination of a brake magnet winding, a motor, reversing switches therefor, brake discharge resistance in a circuit in shunt to the brake magnet winding, an automatic switch, a switch opened and closed by the automatic switch, and means whereby a circuit is completed through the said switch when closed by the automatic switch and through the brake discharge resistance, said shunt circuit being opened by the opening of the automatic switch.

9. In a system of brake control, the combination of a brake magnet winding, a motor, reversing switches for the motor, an automatic switch, brake discharge resistance connected in a shunt circuit connected across the terminals of the brake magnet winding, and means whereby all circuit connections through the brake magnet winding are broken and said shunt circuit opened when the automatic switch opens.

10. In a system of brake control, the combination of a brake magnet winding, a motor, reversing switches for the motor, an automatic switch, brake discharge resistance connected in parallel with the brake magnet winding, and means in conjunction with the automatic switch whereby the parallel connection of the brake winding and discharge resistance is instantaneously broken when the automatic switch opens.

11. In a system of brake control, the combination of a brake magnet winding, a motor, reversing switches for the motor, brake discharge resistance, and circuit connections whereby the said brake winding and discharge resistance are connected in parallel to a source of current supply as soon as a reversing switch is closed and are in series with each other when the said switch is opened, and automatic means for controlling the circuit through the discharge resistance.

12. In a system of brake control, the combination of a brake magnet winding, a motor, reversing switches for the motor, brake discharge resistance, means whereby the brake winding is at first partially deënergized when a reversing switch is opened and thereafter fully deënergized, and automatic means whereby a sudden deënergizing of the brake winding may be effected.

13. In a system of electric brake control, the combination of a brake device, a brake magnet winding, a motor, reversing switches for the motor, brake discharge resistance, means whereby the brake device is automatically applied first with light pressure and finally with full pressure to stop the motor when a reversing switch is opened, and additional means for automatically effecting the immediate application of the brake with full power under predetermined conditions.

14. In a system of brake control for electric elevators, the combination of a motor, a brake device, a brake magnet winding, brake discharge resistance, reversing switches for the motor, an automatic switch, means whereby the brake is gradually applied when a reversing switch is opened, and means whereby the brake is instantaneously applied when the automatic switch is opened.

15. In a system of brake control for electric elevators, the combination of a motor, a brake device, a brake magnet winding, brake discharge resistance, reversing switches for the motor, an automatic switch, a controller switch for controlling the ordinary operation of the reversing switches, means whereby the brake device may be automatically applied with gradual increasing pressure when a reversing switch is opened, and means independent of the reversing switches whereby the instantaneous application of the brake device may be effected.

16. In a system of brake control for electric elevators, the combination of a motor, a brake device, a brake magnet winding, brake discharge resistance, reversing switches for the motor, an automatic switch, and automatic selective means whereby the brake device is applied either with gradually increasing pressure or with instantaneous full pressure.

17. In a system of brake control for electric elevators, the combination of a motor, a brake device, a brake magnet winding, brake discharge resistance, reversing switches for the motor, an automatic switch, electrical conductors providing a local circuit through the brake resistance and magnet winding in series while a reversing switch is open, means in connection with the automatic switch for opening said circuit, and separate automatic means for opening said circuit.

18. In a system of brake control for electric elevators, the combination of a motor, a brake device, a brake magnet winding, brake discharge resistance, reversing switches for the motor, an automatic switch, electrical conductors providing a local circuit through the brake resistance and magnet winding in series while a reversing switch is open, means in connection with the automatic switch for opening said circuit, and limit switches for automatically opening said circuit at a predetermined point to effect the instantaneous full application of the brake.

19. In electric controlling mechanism, the combination with a brake magnet winding connected to a source of current supply, a resistance connected in parallel with said winding and normally in circuit therewith, means for opening and closing said parallel circuit, and means for controlling the supply of current to said winding.

20. In electric controlling mechanism, the combination with a circuit comprising a brake coil, of a parallel circuit including a resistance, means for opening the circuit to the brake coil while the resistance is connected in parallel therewith, and means for successively opening the resistance circuit and the brake coil circuit.

21. In electrical controlling mechanism, the combination with an electric motor, of an electromagnetic brake, means for supplying current to the motor and brake magnet winding, a device for retarding the operation of the brake when the current supply is cut off, and automatically operated means for rendering said retarding device inoperative.

22. In electrical controlling mechanism, the combination with an electric motor, of an electromagnetic brake, means for connecting the motor and brake to a source of current supply, mechanism for cutting off the current supply and effecting a gradual application of the brake, and additional mechanism operated by the motor for cutting off the current supply and effecting a quick operation of the brake.

23. In electrical controlling mechanism, the combination with an electric motor, of an electromagnetic brake, a resistance normally connected in parallel with the brake coil, means for supplying current to the brake coil, and means for automatically opening the circuit through said resistance independently of the brake coil circuit.

24. In electrical controlling mechanism, the combination with an electric motor, of a brake coil, a resistance normally connected in parallel with said coil, means for opening the circuit through said resistance independently of the brake coil circuit, and electric circuits and controlling devices for the motor.

25. In electrical controlling mechanism, the combination with an electric motor, of an electromagnetic brake, a device in a circuit in parallel to the brake magnet winding for retarding the application of the brake, and automatic means for rendering said retarding device inoperative and effecting a quick operation of the brake.

26. In electrical controlling mechanism, the combination with an electric motor, of an electromagnetic brake, circuits and mechanism for supplying current to the motor, and brake, a manual device for cutting off the supply of current to the motor brake and controlling the self-induction of the brake magnet to effect a comparatively slow operation of the brake, and automatic means for cutting off the supply of current to the motor and effecting a quick action of the brake.

In testimony whereof, I have signed my name to this specification in the presence of two subscribing witnesses.

ERNEST L. GALE, Sr.

Witnesses:
EDWARD H. STEELE,
GEORGE D. ROSE.